United States Patent Office 3,354,959
Patented Nov. 28, 1967

3,354,959
HYDRAULIC FRACTURING WITH SPACED PROPS
Clarence R. Fast and George C. Howard, Tulsa, and Fredrick H. Rixe, near Catoosa, Okla., assignors to Pan American Petroleum Corporation, Tulsa, Okla., a corporation of Delaware
Filed Nov. 19, 1965, Ser. No. 508,858
5 Claims. (Cl. 166—42)

This invention relates to hydraulic fracturing of subsurface earth formations. More particularly it relates to fracturing operations where solid particles are deposited in the fracture to hold the faces apart.

In U.S. Patent 3,217,801 it is suggested that fracture props be accompanied by spacer particles soluble in a formation liquid. When this mixture is deposited in a fracture and the soluble spacer particles are dissolved, wide flow channels are provided between the props. The patent suggests that the densities of the spacer particles and the propping particles be closely matched to avoid any separation during placement. Economic considerations, however, sometimes make it desirable to use props and spacers of different densities.

Work with particles of different densities has indicated that the problems of mismatched densities are not serious in many cases. For example, at rates of water flow greater than about 0.7 or 0.8 foot per second, in a fracture about 0.2 inch between faces, the water is in turbulent flow. Under these conditions, particles with similar sizes and shapes flow along together even if one has a density about 20 or 30 percent greater than the other. In the average fracturing operation this means that such props and spacers will travel together for the first 40 or 50 feet from the well. Beyond this distance, however, flow becomes laminar and some separation can take place. As pointed out in U.S. Patent 3,217,801, the ratio of props to spacers can vary within rather wide limits so considerable separation is permissible. For best results, however, flow of the props and spacers at more nearly the same rate is obviously desirable.

An object of this invention is to provide a method for causing the fracture props and soluble spacers for these props to move along in a fracture at more nearly the same velocity even though they have different densities. Still other objects will be apparent to those skilled in the art from the following descriptions and claims.

In general, we solve this problem by changing the size of the spacer particles to cause them to move at the same velocity as the props. It is rather well known from geological texts on sedimentation that particles which have a high density move along in streams at velocities less than those of similar particles of lower density. It is also fairly well known that in streams on the surface of the earth, the smaller particles stay suspended better than the larger ones and therefore move along more rapidly than the larger particles. Thus, it would seem that lower-density particles should be made larger to slow them down.

It has been found experimentally, however, that in a narrow flow channel between closely spaced faces, and where a carrying liquid is in laminar flow, larger particles move more rapidly than smaller ones. For example, in a channel 0.2 inch between faces at a water flow rate of 0.50 foot per second, a rounded hard plant seed particle, in this case a black walnut shell particle, 0.666 inch in diameter moves at a rate of 0.485 foot per second. Under the same conditions, a nutshell particle 0.033 inch in diameter moves at 0.260 foot per second. The explanation may be that in the narrow flow channel bounded on both faces by a fixed surface, the film of water near the surfaces moves very slowly while the liquid near the center of the channel moves more rapidly. Small particles tend to become caught in the slower moving film near the surfaces, while larger particles extend out farther into the more rapidly moving center of the stream and are carried along more rapidly. In this connection, when liquid velocities are given herein it will be understood that they are average values determined by dividing the volume passing a point by the time required to pass the point. Other tests have confirmed that in the narrow flow channels lower density particles move more rapidly than higher density particles of similar size and shape, just as they do in open streams on the surface of the earth. It will be apparent from the above work, regardless of whether the explanation is correct or not, that the lower density particles should be smaller than the higher density ones.

There is still a question how much smaller the lower density particles should be. Further work has shown that the ratio of diameters of high density and low density particles can vary considerably depending on particle size, liquid velocity, particle density differences, and the like. Most of the work was done with rounded black walnut shell particles and approximately spherical particles of an oil-soluble resin which was a low molecular weight copolymer of a vinyl aromatic and a cyclic diolefin. The density of the nutshell particles was about 1.4 grams per milliliter while the density of the resin was about 1.1. These particles were used in sizes ranging from about 0.094 to about 0.017 inch in diameter (8 to 40 mesh U.S. Standard Sieve sizes) with water velocities varying between about 0.25 and about 0.75 foot per second. Between these limits, the ratios of diameter of nutshells and resin to cause the particles to move at the same velocity varied beween about 1.9 and about 1.1. The best average value seemed to be about 1.4. It will be obvious that this is close to the density ratio of about 1.27.

The general equation for determining the size of spacer particles to use with a given propping particle is as follows:

$$D_s = D_p \times \frac{\rho_s}{\rho_p} \left( 0.5 \frac{\rho_s}{\rho_p} + 0.5 \right)$$

Where:
$D_s$ is the diameter of spacing particles
$D_p$ is the diameter of propping particles
$\rho_s$ is the density of spacing particles
$\rho_p$ is the density of propping particles.

The term $$\left( 0.5 \frac{\rho_s}{\rho_p} + 0.5 \right)$$

is an empirically determined correction factor which is 0.9 for the nutshells and resin. The term is, of course, 1.0 for spacers and resins of the same density.

It should be emphasized that this is an empirical expression derived from experimental data and should not be extended very far beyond the experimental conditions used in deriving it. That is, the equation should be used where one type of particle has a density up to about 40 percent more than the density of the other particle. Beyond this range, the relationship can be expected to give only a rough approximation of the best size of props and spacers to use. There is little point in adjusting the size of spacers if the prop and spacer densities are within about 10 percent of each other. Therefore, the general expression given above should be used in cases where the density of one type of particle is from about 1.1 to about 1.4 times the density of the other type of particle. Preferably, the equation should be used with props and spacers having a density from about 1.0 to about 1.5 grams per milliliter.

The fracture props generally are not of a single size. The propping particles usually extend over a considerable range of sizes. For example, when nutshell props are used, the sizes sometimes range from those barely passing a number 12 U.S. Standard sieve, to those barely retained on a number 20 sieve. It will be obvious that the spacer particles in such a case should also extend over a range of sizes. The range of spacer particle sizes should be such that the smallest spacer particles stay with the smallest propping particles and the largest spacer particles stay with the largest propping particles. If the oil-soluble resin having a density of about 1.1 is used with the nutshells having a density of about 1.4 and the particle size range given above, then the spacer particles should be in the range passing a number 16 sieve and retained on a number 30 sieve.

The fracturing methods used, the nature of fracturing liquids and props, volume of fracturing liquids, equipment and the like can, in general, be any of those described in the prior art in the field of hydraulic fracturing, and particularly in U.S. Patent 3,217,801. For example, the spacer particles may be temporary because they melt or evaporate at formation conditions. Spacer particles which are soluble in formation liquids are preferred, however. Since many variations are available to those skilled in the art, we do not wish to be limited to the example given above, but only by the following claims.

We claim:
1. A method of fracturing a subsurface earth formation penetrated by a well in which method a liquid is forced down a well under sufficient pressure to fracture said formation, and in which fracture propping particles are included in said liquid together with temporary particles for spacing said props apart, and in which the density of one type of particle is from about 1.1 to about 1.4 times the density of the other type of particle, the improvement comprising use of spacer particles having a diameter $D_s$ in the expression

$$D_s = D_p \frac{\rho_s}{\rho_p}\left(0.5\frac{\rho_s}{\rho_p} + 0.5\right)$$

where:

$D_s$ = spacer particle diameter
$D_p$ = propping particle diameter
$\rho_s$ = spacer particle density
$\rho_p$ = propping particle density.

2. The method of claim 1 in which the density of both propping and spacer particles are within the range from about 1.0 to about 1.5 grams per milliliter.

3. The method of claim 1 in which said spacer particles are soluble in a formation liquid.

4. The method of claim 1 in which said propping particles are hard plant seed particles having a density of about 1.4, said spacer particles are an oil-soluble resin having a density of about 1.1 and the diameters of said oil-soluble resin particles are about 0.9 times the diameters of said hard plant seed particles.

5. The method of claim 1 in which said propping particles are black walnut shells, said spacer particles are a low molecular weight copolymer of a vinyl aromatic and a cyclic diolefin and the diameters of said spacer particles are about 0.9 times the diameters of said walnut shell particles.

References Cited
UNITED STATES PATENTS

| | | | |
|---|---|---|---|
| 3,195,635 | 7/1965 | Fast | 166—42 |
| 3,217,801 | 11/1965 | Fast et al. | 166—42 |
| 3,241,613 | 3/1966 | Kern et al. | 166—42 X |
| 3,259,190 | 7/1966 | Parsons | 166—42 |
| 3,266,573 | 8/1966 | Rixe | 166—42 |
| 3,302,719 | 2/1967 | Fischer | 166—42 |
| 3,316,965 | 5/1967 | Watanabe | 166—42 X |

STEPHEN J. NOVOSAD, *Primary Examiner.*